United States Patent [19]

Turner

[11] 4,401,588
[45] Aug. 30, 1983

[54] MANUFACTURE OF ACTIVATED CARBON FABRIC

[75] Inventor: John J. P. Turner, Wilmington, Del.

[73] Assignee: E. I. Du Pont de Nemours and Company, Wilmington, Del.

[21] Appl. No.: 401,309

[22] Filed: Jul. 23, 1982

[51] Int. Cl.³ .................. B01J 37/10; D01F 9/12; D01F 9/14
[52] U.S. Cl. .................. 252/421; 423/447.7; 423/447.2; 423/447.1
[58] Field of Search ............... 423/447.1, 447.2, 447.7; 252/421, 422, 426

[56] References Cited

U.S. PATENT DOCUMENTS

| | | | |
|---|---|---|---|
| 3,576,769 | 4/1971 | Hirsch et al. | 260/2.5 |
| 3,831,760 | 8/1974 | Economy et al. | 210/242 |
| 3,849,332 | 11/1974 | Bailey et al. | 252/422 |

FOREIGN PATENT DOCUMENTS

| | | | |
|---|---|---|---|
| 2411256 | 7/1979 | France | |
| 55-7583 | 1/1980 | Japan | 423/447.1 |

*Primary Examiner*—O. R. Vertiz
*Assistant Examiner*—Steven Capella

[57] ABSTRACT

Activated carbon fabric is made directly from aramid fabric in a single carbonization/activation step.

5 Claims, No Drawings

MANUFACTURE OF ACTIVATED CARBON FABRIC

The Government has rights in this invention pursuant to Contract No. DAAK-60-80-C-0092 awarded by the Department of the Army.

BACKGROUND OF THE INVENTION

Activated carbon fibers and fabrics are useful because of their sorptive qualities. They have been prepared from acrylic and rayon precursors by processes involving an oxidation/stabilization step followed by a carbonization/activation step. Such processes are slow and costly, generally involving substantial investment. In those instances where fibers are treated, they are usually maintained under tension during the oxidation/stabilization step to minimize fusion and shrinkage. The resulting fibers are also fragile and difficult to convert to fabric form.

It is also well known to prepare carbon fibers for reinforcement, conductive and refractory purposes. Aromatic polyamide fiber is sometimes used as precursor for such fibers.

The process of the present invention converts aramid fabrics directly in a single step to flexible, high surface area activated carbon fabrics without the use of tension.

SUMMARY OF THE INVENTION

The invention comprises a process for making activated carbon fabric by heating an aramid fabric under a gaseous stream containing a mixture of inert gas, preferably nitrogen, and from about 0.5 to 20 volume percent of steam, at a temperature in the range of 850° to 950° C., for at least about 10 minutes and cooling the fabric to room temperature in a protective atmosphere to prevent ignition.

DESCRIPTION OF PREFERRED EMBODIMENTS

Aramid fabrics are useful precursors for the activated carbon fabrics prepared in accordance with the present invention. The fabrics may be in any convenient form, such as woven, nonwoven, or knit fabrics. Examples of aramid yarns useful in fabric precursors for this invention are poly(benzimidazole) and poly(p-phenylene terephthalamide) yarns.

In accordance with the practice of the present invention, the aramid fabric is generally placed in an oven purged with a flow of nitrogen or other inert gas such as argon or helium and the temperature of the fabric is raised from room temperature to the carbonization/activation temperature in the range of 850° to 950° C. The heat-up period may take up to 30 minutes or even longer. The fabric need not be under tension. The presence of small amounts of water or carbon dioxide during the heat-up period does not interfere.

A gaseous stream consisting of nitrogen or other inert gas and from about 0.5 to 20, preferably at least 3 volume percent of steam, is then passed over the fabric for at least about 10 minutes, preferably at least 30 minutes, while heating is continued to maintain a temperature in the range of 850° to 950° C. The fabric is then cooled to room temperature in an atmosphere which prevents ignition. Inert gas such a nitrogen is preferably employed as the protective atmosphere. Water vapor may be present during cooling but the fabric should be cool enough (about 200° C.) before exposure to air to prevent ignition.

The resulting carbonized/activated fabrics have a high surface area as measured by the B.E.T. method described below and exhibit good flexibility.

TEST PROCEDURES

Surface area was measured by the B.E.T. method using a Micromeritics Model 2100D Surface Area Pore Volume analyser as described in "Particle Size Measurement", T. Allen, Chapman & Hall Ltd., London 1968.

Crease test was performed as follows: the fabric is bent back and forth 180° a total of ten times. A fabric passes the test if it does not break at the crease created in the test.

The following examples are presented as specific illustrations of the claimed invention and are not intended to limit its scope.

EXAMPLE

A weighed (4.63 g) sample of acetone rinsed and oven dried spun poly(p-phenyleneterephthalamide) yarn woven fabric (16 oz/yd$^2$, 543 g/m$^2$ basis weight) was heated under a nitrogen flow (3.05 l/min at 20° C.) from 20° to 900° C. over about 30 min in a 9×9×20 cm stainless steel retort contained in a box furnace. While maintaining the above nitrogen flow, nitrogen purged distilled water was pumped into the retort (0.072 g/min) using a peristaltic tubing pump for 60 min. The water is converted to steam in the hot gaseous stream. The water flow was stopped and the fabric and retort cooled to room temperature under nitrogen flow. The resulting carbonized/activated fabric weighed 1.13 g (24% yield), had a surface area of 790 m$^2$/g as measured by the B.E.T. method, and was sufficiently flexible to pass the crease test described above.

Additional fabrics were processed under the above conditions as shown below.

| Precursor Fabric | Basis Weight (oz/yd$^2$) | Basis Weight (g/m$^2$) | Yield (%) | B.E.T. Surface Area (m$^2$/g) | Crease Test |
|---|---|---|---|---|---|
| Fabric woven from aramid filament poly(p-phenyleneterephthalamide) yarn | 14 | 475 | 16 | 916 | Passed |
| Felt from aramid poly(p-phenyleneterephthalamide) filament yarn | 4.5 | 153 | 5.4 | 955 | Passed |
| Fabric woven from spun poly(benzimidazole) yarn | 4.5 | 153 | 46 | 663 | Passed |

I claim:

1. A process for making an activated carbon fabric in a single step consisting essentially of, heating an aramid fabric under a gaseous stream containing a mixture of inert gas and from about 0.5 to 20 volume percent steam at a temperature in the range of 850° to 950° C. for at least about 10 minutes and then cooling the fabric to room temperature in a protective atmosphere.

2. A process according to claim 1 wherein the inert gas is nitrogen.

3. A process according to claim 2 wherein at least 3 volume percent of steam is present in the gaseous stream.

4. A process according to claim 1 wherein the aramid fabric is constituted by poly(p-phenylene terephthalamide) yarn.

5. A process according to claim 1 wherein the aramid fabric is constituted by poly(benzimidazole) yarn.

* * * * *